(12) United States Patent
Guild et al.

(10) Patent No.: US 8,600,709 B2
(45) Date of Patent: Dec. 3, 2013

(54) ADAPTIVE ANALYTICS MULTIDIMENSIONAL PROCESSING SYSTEM

(75) Inventors: John A. Guild, Edgewater, NJ (US); Hikaru Phillips, Tamarama (AU)

(73) Assignee: Accenture Global Services Limited, Dublin (IE)

( * ) Notice: Subject to any disclaimer, the term of this patent is extended or adjusted under 35 U.S.C. 154(b) by 588 days.

(21) Appl. No.: 12/853,784

(22) Filed: Aug. 10, 2010

(65) Prior Publication Data

US 2011/0054860 A1    Mar. 3, 2011

Related U.S. Application Data

(60) Provisional application No. 61/238,335, filed on Aug. 31, 2009.

(51) Int. Cl.
*G06F 7/60*    (2006.01)

(52) U.S. Cl.
USPC .............................................. 703/2

(58) Field of Classification Search
USPC ................. 703/2, 6; 705/36 R, 10, 14.45, 36; 706/45; 707/71, 73, 100, 102; 725/12
See application file for complete search history.

(56) References Cited

U.S. PATENT DOCUMENTS

| | | | |
|---|---|---|---|
| 5,406,477 A | 4/1995 | Harhen | |
| 5,918,232 A | 6/1999 | Pouschine et al. | |
| 6,697,808 B1 | 2/2004 | Hurwood et al. | |
| 7,526,434 B2 | 4/2009 | Sharp | |
| 7,634,423 B2 | 12/2009 | Brocklebank | |
| 7,725,300 B2 | 5/2010 | Pinto et al. | |
| 7,895,191 B2 * | 2/2011 | Colossi et al. | 707/717 |
| 2002/0127529 A1 * | 9/2002 | Cassuto et al. | 434/335 |
| 2003/0074358 A1 | 4/2003 | Sarbaz et al. | |
| 2004/0031058 A1 * | 2/2004 | Reisman | 725/112 |

(Continued)

FOREIGN PATENT DOCUMENTS

| | | |
|---|---|---|
| JP | 10-049544 A | 2/1998 |
| JP | 2000-020504 A | 1/2000 |

(Continued)

OTHER PUBLICATIONS

Shūsaku Wada, 'Construction of the Multiple Autoregression Model Based on the Demand Factors', Journal of the Japan Industrial Management Association, vol. 51, No. 5, Japan, Japan Industrial Management Association, Dec. 15, 2000, vol. 51, pp. 446-451.

(Continued)

*Primary Examiner* — Kandasamy Thangavelu
(74) *Attorney, Agent, or Firm* — Mannava & Kang, P.C.

(57) ABSTRACT

A system includes a multidimensional data processing system storing meta data identifying a plurality of variables, a plurality of dimensions for each variable describing attributes of the variable, and a plurality of levels in each dimension. The meta data also identifies a hierarchy of the dimensions and levels for each variable. The multidimensional data processing system is configured to use the meta data to perform multidimensional queries to retrieve data for one or more of the variables from data storage. The system also includes a variable determination module determining at least one variable of the plurality variables operable to be used to generate a model, and a model generator receiving the data from the multidimensional data processing system and generating a model using the data.

19 Claims, 9 Drawing Sheets

(56) References Cited

U.S. PATENT DOCUMENTS

| | | | |
|---|---|---|---|
| 2004/0093296 A1* | 5/2004 | Phelan et al. | 705/36 |
| 2005/0071218 A1* | 3/2005 | Lin et al. | 705/10 |
| 2005/0234760 A1 | 10/2005 | Pinto et al. | |
| 2006/0241923 A1* | 10/2006 | Xu et al. | 703/2 |
| 2006/0271568 A1* | 11/2006 | Balkir et al. | 707/100 |
| 2007/0106550 A1* | 5/2007 | Umblijs et al. | 705/10 |
| 2008/0065470 A1* | 3/2008 | Nelmes et al. | 705/10 |
| 2008/0154693 A1 | 6/2008 | Bateni et al. | |
| 2008/0195649 A1* | 8/2008 | Lefebvre | 707/102 |
| 2009/0030864 A1* | 1/2009 | Pednault et al. | 706/45 |
| 2009/0089254 A1* | 4/2009 | Von Kaenel et al. | 707/3 |
| 2009/0234710 A1* | 9/2009 | Belgaied Hassine et al. | 705/10 |
| 2010/0082521 A1 | 4/2010 | Meric et al. | |
| 2010/0106555 A1* | 4/2010 | Mneimneh et al. | 705/10 |
| 2010/0114794 A1* | 5/2010 | Lakshminarayan et al. | 705/36 R |
| 2010/0169174 A1* | 7/2010 | Anderson et al. | 705/14.45 |

FOREIGN PATENT DOCUMENTS

| | | |
|---|---|---|
| JP | 2005-063353 A | 3/2005 |
| JP | 2005-302040 A | 10/2005 |
| JP | 2006-012143 A | 1/2006 |
| JP | 2006-513474 A | 4/2006 |
| JP | 2007-25843 A | 2/2007 |
| WO | 03021514 A1 | 3/2003 |
| WO | 2004/063942 A1 | 7/2004 |
| WO | 2007/064374 A3 | 6/2007 |
| WO | 2008/092147 | 7/2008 |
| WO | 2008092147 | 7/2008 |

OTHER PUBLICATIONS

Guoliang Zhou, et al., "What-if Analysis in MOLAP Environments", 2009 Sixth International Conference on Fuzzy Systems and Knowledge Discovery, Aug. 16, 2009, vol. 2, pp. 405-409.

Andrey Balmin, et al., "Hypothetical Queries in an OLAP Environment", [online], Proceedings of the 26th VLBD Conference, Cairo, Egypt, 2000, pp. 220-231, [retrieved May 14, 2012], Internet <URL, http://www.vldb.org/dblp/db/conf/vldb2000.html>.

Metadata, http://web.archive.org/web/20070509165728/http://www.bookrags.com/wiki/Metadata, published on May 9, 2007, Wayback Engine.

Guoliang, Zhou et al., "What-if Analysis in MOLAP Environments", Fuzzy Systems and Knowledge Discovery, 2009, FSKD '09, Sixth International Conference on, IEEE, Piscataway, NJ, USA, [Online], Aug. 14, 2009, pp. 405-409, XP031584609.

Azharul, Hasan K M et al.: "An Efficient Implementation for MOLAP Basic Data Structure and Its Evaluation", Apr. 9, 2007, Advances in Databases: Concepts, Systems and Applications; [Lecture notes in computer science], Springer Berlin Heidelberg, Berlin, Heidelberg, pp. 288-299, XP019078844.

Pedersen, T B et al.: "Multidimensional Database Technology", Computer, IEEE Service Center, Los Alamitos, CA, US LNKD—DOI: 10.1109/2.970558, vol. 34, No. 12, Dec. 1, 2001, pp. 40-46, XP001092482.

Joseph, Joy V., "Understanding Advertising Adstock Transformations", Munich Personal RePEc Archive (MPRA) Paper, Mar. 12, 2008, pp. 1-7, [online], [retrieved on Oct. 15, 2012]. Retrieved from the Internet <URL: http://mpra.ub.uni-muenchen.de/7683/4/Adstock_Model.pdf>.

* cited by examiner

ADAPTIVE ANALYTICS MULTIDIMENSIONAL PROCESSING SYSTEM

PRIORITY

This patent application claims priority to U.S. provisional application Ser. No. 61/238,335, filed Aug. 31, 2009 and entitled "Adaptive Analytics with MOLAP System", which is incorporated by reference in its entirety.

RELATED APPLICATION

The patent application is related to U.S. patent application Ser. No. 12/830,608, filed on Jul. 6, 2010 and entitled "Marketing Model Determination System", which is incorporated by reference in its entirety.

BACKGROUND

Many companies spend millions of dollars each year on advertising and other marketing activities to improve sales. However, it is very difficult to determine how their marketing activities are impacting their sales. This is primarily due to the many factors that can actually influence sales, which may or may not be related to the marketing activities performed by the companies. For example, economic trends and competitor pricing may impact sales, as well as advertising in relevant marketing channels. As a result, companies have great difficulty focusing their marketing efforts and resources on the activities that are most likely to improve sales.

One approach to determining how a marketing activity impacts sales is to use modeling. Modeling may be used to forecast or predict behavior or outcomes. Models may be generated through a regression analysis or other method of analyzing historic data. For example, companies may use historic sales data to generate a model to predict how sales will be impacted in the future, and these companies may make adjustments to improve sales based on the predictions. However, as indicated above, there are many variables that may be included in the model based on all the factors that may influence sales. Furthermore, some variables may be more accurate than other variables based on insufficient data, inaccuracies and other factors. It is very difficult to select the variables to use in the model that would yield the most accurate forecasting results. Accordingly, many models that may be currently used for forecasting can be inaccurate. Furthermore, it is very difficult to manage the data, especially for large number of variables, so the data can be used to build models. Accordingly, the processing of the data sets to build models may involve immense processing time.

SUMMARY

According to an embodiment, a system includes a multidimensional data processing system storing meta data. The meta data identifies a plurality of variables, a plurality of dimensions for each variable describing attributes of the variable, and a plurality of levels in each dimension. The meta data also identifies a hierarchy of the dimensions and levels for each variable. The multidimensional data processing system is configured to use the meta data to perform multidimensional queries to retrieve data for one or more of the plurality of variables from the data storage. A variable determination module determines at least one variable of the plurality variables operable to be used to generate a model. The multidimensional data processing system receives an indication of the at least one variable from the variable determination module, identifies the meta data for the at least one variable, and retrieves information for at least one of the plurality of dimensions and at least one of the plurality of attributes for the at least one variable from the data storage using the meta data. The system also includes a model generator, executed by a computer system, receiving the information from the multidimensional data processing system and generating a model using the information.

According to an embodiment, a method for performing multidimensional querying includes storing meta data in a multidimensional data processing system. The meta data identifies a plurality of variables, a plurality of dimensions for each variable describing attributes of the variable, and a plurality of levels in each dimension, and the meta data indicates a hierarchy of the dimensions and levels for each variable. The method also includes receiving a query identifying a variable, a dimension and a level for at least one variable of the plurality of variables; searching the stored meta data to identify data in a data storage for the dimension and the level for at least one variable; retrieving the data from the data storage using the meta data; and generating a model using the meta data.

According to an embodiment, a non-transitory computer readable medium may store computer readable instructions that when executed by a computer system perform the method for performing multidimensional querying includes storing meta data in a multidimensional data processing system.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details.

In some instances, well known methods and structures have not been described in detail so as not to unnecessarily obscure the embodiments.

According to an embodiment, a multidimensional data processing system stores meta data for variables that may be used to build models. The meta data identifies hierarchies for the variables. The variables may have dimensions, also referred to as attributes, organized in a hierarchy. The hierarchy may include sub-attributes (i.e., levels) for each dimension. For example, one dimension for a marketing channel variable may be geography, and the sub-attributes or levels in the hierarchy may be country, region, city, and zip code. The multidimensional data processing system uses the meta data to perform multidimensional queries to retrieve data for one or more dimensions and levels for variables from the data storage. The retrieved data may be used for simulation and forecasting a predicted variable, such as sales volume, based on historic data for one or more other variables, such as marketing investments in various marketing channels.

The multidimensional data processing system may also include a differential versioning module storing meta data for a plurality of different versions of a base data set stored in the data storage. The meta data identifies the base data set for each version and a differential data set for each version, and the multidimensional data processing system uses the meta data for a version of the plurality of different versions to retrieve at least one of the base data set and the differential data set for the version from the data storage.

According to an embodiment, a system is configured to analyze data related to sales and determine models identifying relationships between variables in the data and a marketing objective, such as improving sales, improving brand equity, etc. Data for variables along different dimensions and levels may be retrieved by the multidimensional data processing system and evaluated and selected for use in the models. The models may then be used for forecasting, and development of marketing plans. The system may provide a web-based, GUI that allows for easy use.

Some of the features of the system include econometric modeling, fact-based planning and causal forecasting. The system may additionally provide data diagnostics and visualization, mix-model building, and what-if scenario capability. The system may include a web-based, enterprise-ready, scalable computer platform with both hosted ("on-demand") or onsite deployment options. Other smaller-scale computer platforms may be used. Software running on the computer platform provides the functions of the system.

Figure 1:
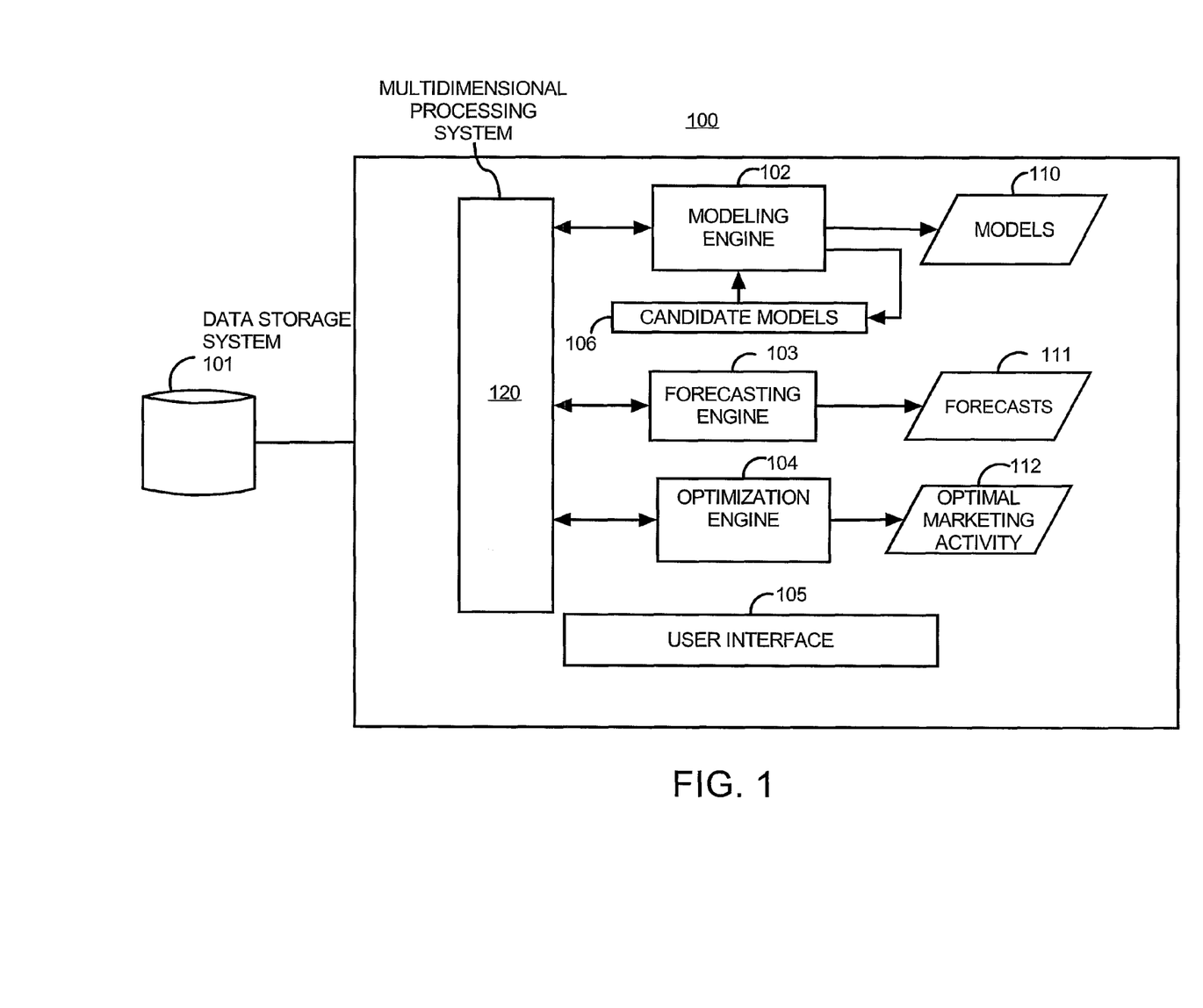
FIG. 1 illustrates a system, according to an embodiment.

FIG. 1 illustrates a system 100, according to an embodiment. The system 100 includes a modeling engine 102, a forecasting engine 103, an optimization engine 104, a user interface 105, and a multidimensional processing system connected to a data storage system 101. The data storage system 101 stores data for variables used to build models. The data may be related to a marketing objective. One example of a marketing objective is improving sales. The stored data may include historic sales data, variables for data related to marketing activities, economic trends, and other types of data. The variables may include different metrics that impact sales. For example, the variables may include costs (e.g., amount spent) for activities in different marketing channels, such as TV, radio, print, and online. Other variables may include macro-economic factors that impact sales, such as unemployment, gross domestic product, etc. The data storage system 101 may also store data entered by a user through the user interface 105 and may store models and other information generated by the system 100.

The modeling engine 102 uses the data for the variables, which may be provided by a user or other data sources, to generate relationships between the variables and the marketing objective, such as sales performance. These relationships form the models 110. In one example, a relationship between a variable and sales may be represented as a curve or function. For example, a curve may be generated whereby each point on the curve indicates a predicted amount of sales generated (incremental or cumulative) for an amount invested or spent for the variable.

The modeling engine 102 uses various transformations and other mechanisms to develop the models. A transformation describes how a variable impacts the marketing objective. The transformation may also describe how the variable impacts another variable. A transformation may be represented by a function that uses one or more input parameters to adjust function variables. Examples of the transformations include ad-stocking, advertising lag, and ad saturation. Ad-stocking is a decay rate mechanism for advertising indicating the decaying effectiveness of an ad over time. Ad lag is the time-shifted impact of advertising. If you advertise in one week, the impact of that advertising is going to show up in sales but not in that week necessarily. Instead, it might be in a period of the next eight weeks, and the ad-lag may indicate that delayed effectiveness of the advertisement (ad). Ad saturation uses a diminishing-return function which is an exponential function that indicates, as the market is saturated with marketing, that the impact of the ad will likely reduce. For example, for a million dollars spent on a marketing activity, the first 50 thousand invested is more likely to impact sales rather than the last 50 thousand invested. Ad saturation may also be referred to as ad power. The ad power may indicate the amount of diminishing returns per amount spent. Another example of a transformation may include a synergy effect. The synergy effect is when actions for at least two types of marketing activities positively impact sales for the same product. The synergy effect is a combined or complementary effect of simultaneous marketing activities. For example, if amount spent for two different marketing activities was increased by 2% for each activity, the synergy effect causes the sales of the product to improve by 10% rather than 4%.

For example, given a selected set of input variables (which may include one or more selected dimensions and levels), a statistical regression (e.g., linear regression) approach is used to determine model coefficients. These are coefficients for the variables of the model that best map the data for the variables (e.g., cost data for marketing channels) to corresponding historic performance data. A best-fitting process is performed to determine curves describing a relationship between given input data and its corresponding output.

The modeling engine 102 may use variables, assumptions and data, such as historic sales data to generate the models 110. Through the user interface 105, different variables may be selected. Also, dimensions and levels may be selected for the variables. Assumptions may also be received. The assumptions may include transformations and parameters for the transformations. An assumption may include an estimation for a variable or set of variables. The estimation may be an estimation for one or more transformations. For example, the estimation may be an amount of lag, power or ad stock for a variable. The estimation may be an assumption about interaction transformations, such as amount of synergy or cannibalism between two variables.

The assumption may include one or more rules, also referred to as constraints. The rules may be used to determine the relevance of a variable to sales. The rules may be used to determine whether a variable drops out or is retained during the model testing. The rules may be based on business objectives, such as what is my average return per gross rating point for television marketing. A rule may be a condition. One example of a condition is that a higher price improves sales. The modeling engine 102 tests this condition, and then, if the condition is not met, may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The assumption may also include a filter criteria which describes the marketing objective. For example, equity is a filter criteria, and the model engine 102 is run for the assumptions to determine whether they relate to brand equity. Another example of a filter criteria is sales to see how the assumptions related to sales.

The modeling engine 102 allows a user to vary the variables and assumptions used to generate a model. The variations may be entered through the user interface 105. For each set of variations, the modeling engine 102 generates a candidate model. Multiple candidate models 106 may be generated by the modeling engine 102 for the different variations. The candidate models 106 are evaluated, for example, through statistical measures and other factors to determine their accuracy and viability for forecasting. One or more of the candidate models 106 may be selected as final models, shown as the models 110, to be used for analysis, planning and forecasting.

The forecasting engine 103 uses the models 110 to perform "what-if" analysis to estimate the impact of the variables on sales. For example, a current marketing plan may be stored in the data storage system 101 and includes amount spent for different marketing channels. The user, through the user interface 105, may vary values for variables in the model, such as amount spent for different marketing channels, and the forecasting engine 103 runs these variations through the models 110 and outputs, for example, the estimated sales generated given the amount spent for marketing in each of the channels. By running the forecasting engine 103 for different variations, the user may determine the best amount to invest in each marketing channel to maximize sales.

The optimization engine 104 may be used for the development of the marketing plan. The optimization engine 104 can evaluate the outputs of the forecasting engine 103 to determine how best to optimize variables, such as amount spent for different marketing channels, to maximize sales and create a new marketing plan. The optimization engine 104 may use the models 110 to determine a maximum and minimum amount that should be spent for various marketing channels to maximize sales.

The multidimensional data processing system 120 provides real-time views of data in the data storage 101 for modeling, simulation and forecasting, optimizing and reporting. The multidimensional data processing system 120 stores meta data, which is used for multidimensional querying to support the generation of the views, as well as the modeling, simulation and forecasting, optimizing and reporting.

For example, the multidimensional data processing system 120 stores meta data for the discrete data elements in the data storage 101, which may include a data warehouse. These discrete data elements are referred to as measures. The measures may include historic data for the variables. For example, a variable may include sales volume, and the measures are historic sales volume. Other variables may include marketing investments over time for different marketing channels, and the measures may include the amount invested for print ads, online ads, TV, etc, over time.

The meta data identifies the hierarchies for the variables. The variables may include dimensions and levels organized in a hierarchy through the meta data. The dimensions may be mutually exclusive and, along with the levels, describe collections of measures defined by a hierarchical relationship of levels and their members. The hierarchy is a series of parent-child relationships, typically where a parent member represents the consolidation of the members which are its children. Thus, meta data for each measure in a hierarchy identifies the level and dimension that the measure is in for the hierarchy. Views of the hierarchy may be provided through the user interface 105.

The multidimensional data processing system 120 uses the meta data for multidimensional queries. For example, the multidimensional data processing system 120 may receive a query for data for one or more variables in a specific level of a dimension. The multidimensional data processing system 120 uses the meta data to identify all the data in the data storage 101 for the variables that are in the level, and retrieves the identified data, which are measures, from the data storage 101. Assume the query is for a predicted variable, such as a sales volume variable and an independent variable such as a TV marketing investment variable in a level for a geographic dimension. The geographic dimension may include a hierarchy comprised of levels including country, region, city, and zip code. The level in the query may be region. The multidimensional data processing system 120 identifies all the measures that are in the region level for the variables from their meta data and retrieves the identified measures from the data storage 101.

The multidimensional data processing system 120 may receive queries for variables from the modeling engine 102, forecasting engine 103, the optimization engine 104 an/or a user. The modeling engine 102 may send queries for variables along different levels and dimensions to determine a model identifying the relationships between the levels in the different variables. For example, the modeling engine 102 uses the multidimensional data processing system 120 to obtain time-series data for both dependent and independent variables at the level the model engine 102 is attempting to build relationships. The forecasting engine 103 uses the multidimensional data processing system 120 to obtain historical and forward looking plan data to apply modeled coefficients with independent variable data, and can be used to apply aggregation and distribution for what-if scenarios and distributions. The optimization engine 104 obtains data, such as "seed" values for optimization and stores post-optimization data. The multidimensional data processing system 120 runs the queries to extract the data from the data storage 101 and provides the data to the requestor.

The meta data may also identify assumptions that are used by the modeling engine 102 to build models. The meta data may also include aggregation rules for hierarchies. The aggregation rules specify how data is to be aggregated for a particular level or dimensions. For example, if measures in the data storage are for a city level, the aggregation rules specify how to combine the measures for a lower level in the geographic dimension, e.g., the city level and other intermediate levels, to show data at a higher level, e.g., a regional level. The aggregation rules may be used to generate a model. For example, a model may include a relationship, e.g., a sales response curve, between aggregated data for a specific level and the predicted variable, such as sales volume.

The meta data may also include calculations that can be applied to a measure to translate it to another logical measure, and aggregation and distribution rules that can be applied to each measure. The meta data may also include information regarding the sparsity of data for the measures and dimensions, along with relationships between the dimensions.

The multidimensional data processing system 120 may perform differential versioning by creating meta data for a plurality of different versions of a base data set stored in the data storage 101. The meta data identifies the base data set for each version and a differential data set for each version. The differential data set may only include differences (i.e., changed information) between the base data set and new data for the base data set. For example, if sales volumes are stored for a region by product for the last fiscal quarter, a version may be created for the new fiscal quarter that includes differences in sales volumes for the region by product. The multidimensional data processing system 120 uses the meta data to identify a version of interest and retrieve at least one of the base data set and the version's differential data set from the data storage 101.

The multidimensional data processing system 120 may connect to multiple data sources. For example, the data storage system 101 may represent multiple data sources. The multidimensional data processing system 120 may be connected to a relational database management system (RDBMS) and provide query parsing and execution environments for data access in the RDBMS. In addition, the multidimensional data processing system 120 maybe connected to a Multidimensional Online Analytical Processing (MOLAP) or Relational Online Analytical Processing (ROLAP) system. The multidimensional data processing system 120 may act as a proxy to these external systems to provide a single point of access and a standardized access construct in heterogeneous data environments.

The multidimensional data processing system 120 may create cubes. The cubes may be stored in the multidimensional data processing system 120 or in external systems, such as a MOLAP or ROLAP system. The cubes include meta data describing each dimension and its hierarchy of levels. These cubes allow data to be queried and viewed along different levels of the dimension hierarchy. Also, the cubes allow the data to be viewed along any of the n-dimensions in real-time. Examples of dimensions include time, geography, product/brand, customer segment, distribution channel, etc. Any number of dimensions and cubes can be configured for any of the measures contained in the data storage 101.

The multidimensional data processing system 120 may use in-memory or disk-bound processing of data originating from a relational database management system. The multidimensional data processing system 120, using its stored meta data, may load information into map-based data structures to facilitate rapid random access of data.

Figure 2:
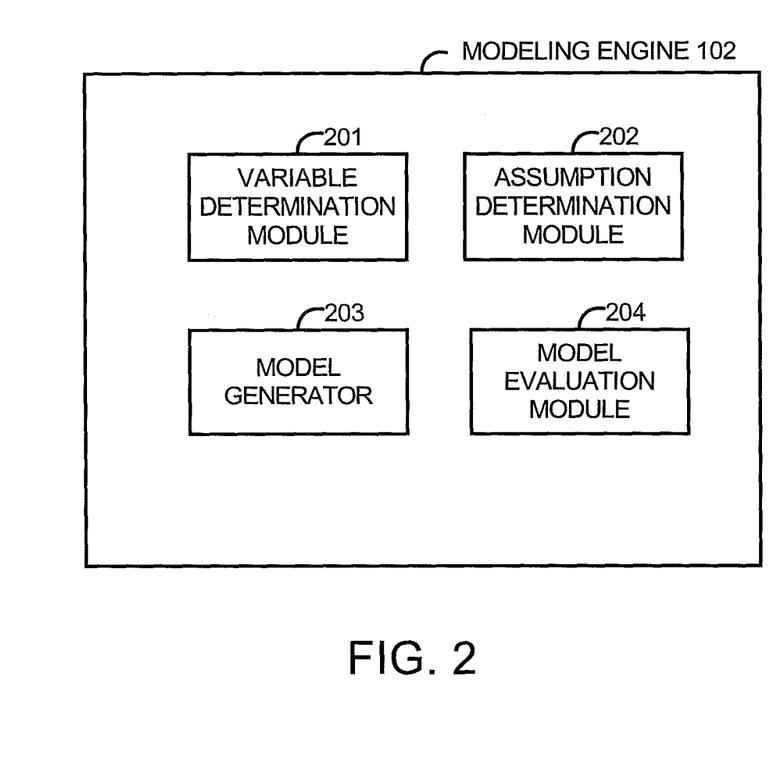
FIG. 2 shows a block diagram of a modeling engine 102, according to an embodiment.

FIG. 2 shows a more detailed block diagram of the modeling engine 102. The modeling engine 102 includes a variable determination module 201, an assumption determination module 202, a model generator 203, and a model evaluation module 204. The modules and other components of the modeling engine 102 may include software, hardware or a combination of software and hardware.

The variable determination module 201 determines the variables to be used for generating a model, and the assumption determination module 202 determines the assumptions to be used for generating the model. In one embodiment, the variables and assumptions may be input by a user through the user interface 105 and received by the modules 201 and 202. Also, modifications to the variables and assumptions may also be input by a user through the user interface 105 and received by the modules 201 and 202 for generating different candidate models.

The model generator 203 generates models using the variables and assumptions determined by the modules 201 and 202. The modeling engine 102 runs the assumptions and variables through multiple, separate regression analyses to determine the relationships between the variables and sales. These relationships form a candidate model which is generated by the modeling engine 102.

Determining the relationships between the variables and sales and determining the response curves describing the relationships is further described in co-pending U.S. patent application Ser. No. 11/483,401, entitled "Modeling Marketing Data" by Andris Umblijs et al., filed Jul. 7, 2006, which is incorporated by reference in its entirety.

For example, given a selected set of variables, a statistical regression (e.g., linear regression) approach is used to determine model coefficients. These are coefficients for the variables of the model that best map the data for the variables (e.g., cost data for marketing channels) to the corresponding historic performance data. Estimation of the coefficients of the variables for a candidate model is performed using regression techniques to produce multi-variable functions (e.g., curves) that best fit computed output of the given input data to its corresponding output. In some embodiments the regression techniques perform non-linear regression for at least some of the variables of the candidate model to account for any non-linear behavior associated with such variables (e.g., market variables that display diminishing returns behavior).

The model evaluation module 204 determines a statistical measure and an indication of relevance for the variables in each candidate model. Based on the statistical measure and indication of relevance for each variable, the candidate model may be selected as the final model or may not be selected. The statistical measure indicates the statistical significance of a variable to the marketing objective. The indication of relevance indicates a level of impact the variable has on the marketing objective.

For example, the model evaluation module 204 evaluates each variable using a function to determine a statistical measure indicating whether the variable is statistically significant. In one example, contribution of the variable to the performance of the model should exceed a pre-defined threshold. The contribution of the variable, which is an example of a statistical measure, is determined using transformed historical data and the produced coefficients to determine an estimate of relative impact on the dependent variable. Subsequently, in certain cases, this relative impact may be run through a heuristic weighting process to determine final contributions for comparison. This model characteristic reflects the fact that the model should not have variables whose contributions to the model's performance is negligible. In some embodiments, the pre-defined statistical significance threshold may be 10%. In some embodiments the threshold may be 5%. Lower or higher statistical significance thresholds may be used according to the level of complexity desired for the model.

Also, the model evaluation module 204 determines whether assumption rules for the variable are satisfied. For example, a rule may be a condition. One example of a condition is that a higher price improves sales. The modeling engine 102 tests this condition, and then, if the condition is not met, may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The model evaluation module 204 determines an indication of relevance for each variable. The indication of relevance indicates a level of impact the variable has on the marketing objective. In one example, the model evaluation module 204 indicates whether a variable is retained or is dropped. An indication that the variable is retained means the variable is relevant to the marketing objective. The indication of relevance may be based on the statistical measure, whether the variable satisfies assumption rules, and/or other factors.

Figure 3:
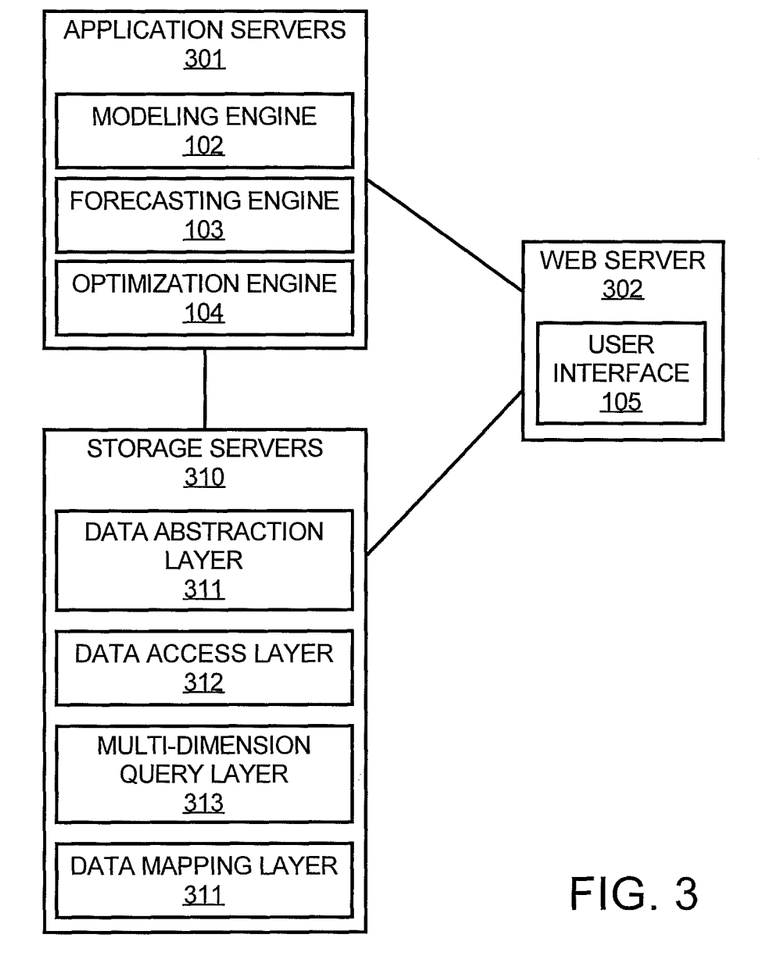
FIG. 3 shows a technical implementation of the system shown in FIG. 1, according to an embodiment.

FIG. 3 shows a technical implementation of the system 100, according to an embodiment. The system 100 includes application servers 301 hosting the modeling engine 102, forecasting engine 103, and optimization engine 104. The data storage system 101 may be hosted by servers and storage systems, such as a storage area network or other conventional system, shown as 310. Architectural layers for the data storage system 101 are shown in 310. In one embodiment, the data storage system 101 utilizes a multidimensional data model as described in further detail below. The data storage system 101 includes a data abstraction layer 311 which is a data structure for data stored in the data storage system 101. The data abstraction layer 311 is shown in more detail in FIG. 3 and includes a meta data layer and data layer.

The data storage system 101 also includes a data access layer 312 that supports access to multidimensional data stored in the data storage system 101. In one example, the data access layer 312 may include XML for analysis (XMLA), which is an industry standard for accessing systems.

A multidimensional query layer 313 supports multidimensional analytical queries. The multidimensional query layer 313 is configured to aggregate across different levels in the hierarchies in the dimensions to respond to multidimensional analytical queries. Meta data for each stored measure indicates aggregation rules for performing multidimensional queries for forecasting and/or data analysis.

Figure 4:
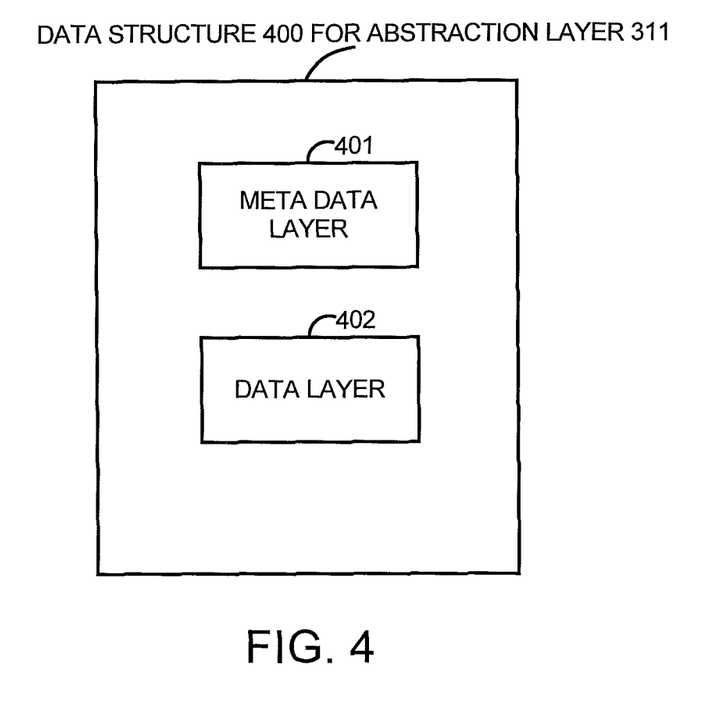
FIG. 4 illustrates a data structure of a data model for a data abstraction layer, according to an embodiment.

A data mapping layer 314 stores data in the data storage system 101 according to the data model shown in FIG. 4. For example, the data mapping layer 314 may associate the proper meta data with each variable across multiple dimensions.

The system 100 may include web servers 302 which host the user interface 105. The user interface 105 may provide a rich user interface allowing users to enter assumptions to test using the modeling engine 102 and allow the user to run reports and generate graphical analysis for forecasting and planning. The technical architecture may be highly scalable to allow processing of large amounts of data for a large number of users.

FIG. 4 illustrates a data structure 400 of a data model for the data abstraction layer 311 shown in FIG. 3. As shown in FIG. 4, the data structure 400 includes a meta data layer 401 and a data layer 402. The meta data layer 401 stores relationship data generated through the process of determining the models 110 using the modeling engine 102 shown in FIG. 1. The relationship data may include a mathematical representation of the relationship between variables in the model and the output of the model, which may be estimated sales. The relationship data may include the coefficients determined by the model generator 203 shown in FIG. 2. The meta data layer 401 also includes the meta data described above for the variables. This meta data may include information describing the assumptions and variables used to create the model, such as transformations, rules, variable dimensions and layers, and other associated information. The meta data layer 401 also supports multidimensional queries by storing aggregation rules for the data. The aggregation rules describe how to aggregate up from a lower level in a hierarchal dimension to a higher level and what transformations to apply for each level. For example, the meta data layer 401 may indicate that if state-level information on sales is requested, then aggregate city level to state for the TV marketing channel variable using a lag transform with predetermined parameters. These aggregation rules may be applied for the "what-if" scenario processing performed by the forecasting engine 103. The data layer 402 identifies the actual data stored in the data storage system 101 that is relevant to the model, such as costs for each marketing activity across different dimensions and at different levels of the hierarchy. In one embodiment, this may include data that is at the lowest level of each dimension, and then the aggregation rules may determine how to aggregate up to higher levels in the dimension.

One technical effect is that through use of the data structure 400, including the meta data, query processing is much faster. The meta data is used to quickly and easily identify the data relevant to a level in a hierarchy and to preserve relationships in the hierarchy. As a result processing for model generation and forecasting is much faster.

Figure 5:
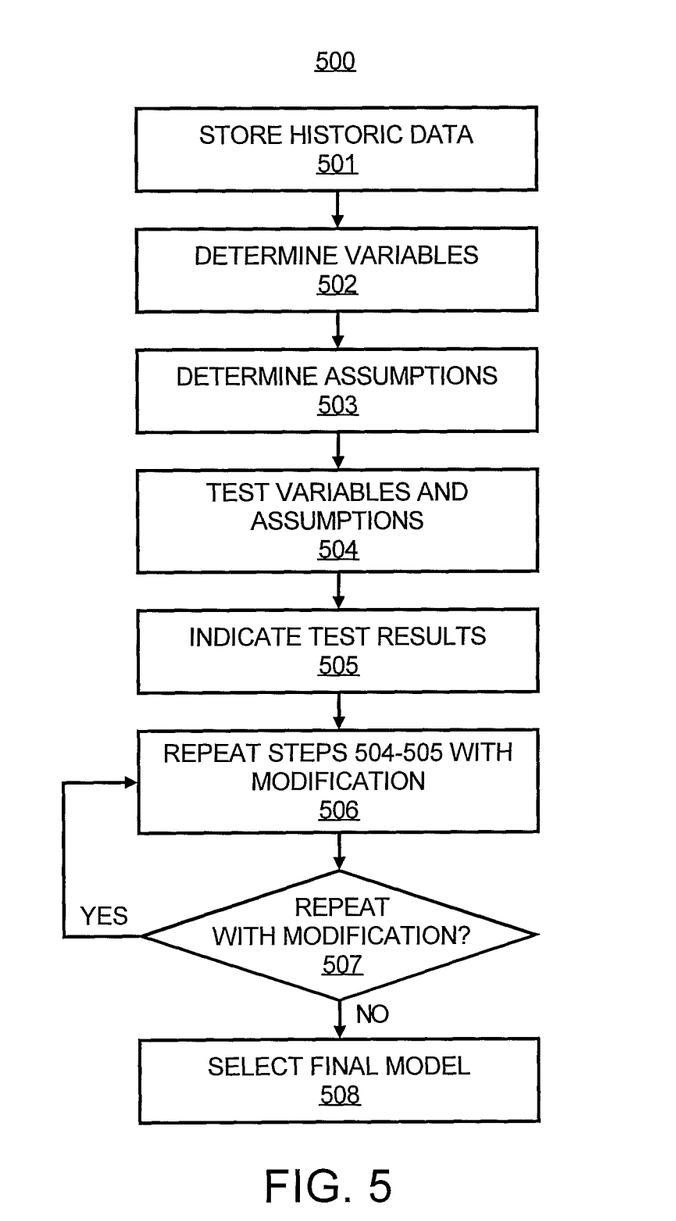
FIG. 5 illustrates a flow chart of a method for determining a final model, according to an embodiment.

FIG. 5 illustrates a flow chart of a method 500 for determining a final model, according to an embodiment. The final model may be used to forecast sales and perform what-if analysis. The method 500 is described with respect to the system 100 shown and described in FIGS. 1-3 by way of example and not limitation.

At step 501, historic data is stored in the data storage system 101. This step may be performed continually or periodically as data is received from sources. The data may include actual sales and cost data as well as other data that can be measured or otherwise determined.

At step 502, a variable or set of variables are determined. For example, variables are selected through the user interface 105. The selection of the variables may include selecting a dimension and or level of one or more of the variables. For example, a product and product type may be selected based on the stored sales data. Also, geography is selected as a dimension and district is selected as a level in a hierarchy for the geography dimension. These variables with their dimension and level are selected for testing in a model.

At step 503, one or more assumptions are determined. The assumptions may be received through the user interface 105. An assumption may include an estimation for the variable or set of variables. The estimation may be an estimation for one or more transformations. For example, the estimation may be an amount of lag, power or ad stock for a variable. The estimation may be an assumption about interaction transformations, such as amount of synergy or cannibalism between two variables.

The assumption may include one or more rules, also referred to as constraints. The rules may be used to determine the relevance of a variable to sales. The rules may be used to determine whether a variable drops out or is retained during the model testing. The rules may be based on business objectives, such as what is my average return per gross rating point for television marketing. A rule may be a condition. One example of a condition is that a higher price improves sales. The modeling engine 102 tests this condition, and then may drop price as a variable or indicate that the condition is not met. In another example, the assumptions may include two mutually exclusive assumptions. For example, one assumption includes the rule that a higher price improves sales. Another assumption includes a rule that a lower price improves sales. One assumption must drop out. Also, both may drop out if both are found not true based on the statistical analysis performed by the modeling engine 102.

The assumption may also include a filter criteria which describes the marketing objective. For example, equity is a filter criteria, and the model engine 102 is run for the assumptions to determine whether they relate to brand equity. Another example of a filter criteria is sales to see how the assumptions related to sales.

At step 504, the received variables and assumptions are tested by the modeling engine 102. The modeling engine 102 runs the assumptions through multiple, separate regression analyses to determine the relationships between the variables and sales. These relationships form a candidate model which is generated by the modeling engine 102. The modeling engine 102, through the regression analysis, also determines statistical measures describing the accuracy of the assumptions in the candidate model.

The modeling engine 102 may test the model for different data sets of historic sales data. A data set may be varied by time frame, dimension levels, etc. The testing for each of the data sets generates multiple candidate models that are evaluated.

At step 505, the modeling engine 102 indicates the testing results. For example, the modeling engine 102 determines a statistical measure for each of the variables in the model and determines an indication of relevance for each of the variables. The indication of relevance may indicate whether to retain each variable, i.e., whether each variable in each assumption is considered to stick. The testing results are indicated for the candidate model.

At step 506, the steps 504 and 505 are repeated with a modification to one or more assumptions or variables. The modification may be to a variable, such as a change to a transformation parameter or adding or deleting transformations, or a change to a dimension or level or adding a new variable. The modification may be to an assumption such as a modification to a filtering criteria, an aggregation rule or an assumption rule. The modeling engine 102 determines testing results for the new candidate model.

At step 507, a determination is made as to whether to generate more candidate models by modifying the assumptions. A user may determine based on testing results whether to continue generating more candidate models. The decision may be based on the statistical evaluation (i.e., testing results from step 505) indicating how relevant each variable is to impacting sales or some other objective. For example, if the user determines that 40% of the variables were dropped, the user may continue to generate additional candidate models until at least 80% of the variables are retained.

At step 508, a candidate model is selected as a final model to be used for forecasting. Forecasting may include simulating various scenarios to estimate how it will impact sales. For example, the final model may be used to determine whether increasing marketing spend for a particular channel will improve sales. The forecasting engine 103 performs the forecasting using the final model.

The candidate models may be tested to determine the best performing candidate model, and then the best performing candidate model may be selected as the final model. For example, the system 100 generates a curve of actual sales for a predetermined historic time period, given a set of inputs. Using the same set of inputs and the candidate model, a curve is generated for an estimation of sales. The curves are compared. The candidate model having the smallest error between curves may be selected as the final model.

At step 508, the assumptions for the final model are stored in the meta data layer of the data structure 400. For example, the data structure 400 shown in FIG. 4 includes a meta data layer 401 and a data layer 402. The meta data layer 401 stores the assumptions, variables, dimensions and levels, aggregation rules, and relationship data for the final model. The data layer 402 identifies the actual data stored in the data storage system 101 that is relevant to the final model, such as costs for each marketing activity across different dimensions and at different levels of the hierarchy. In one embodiment, this may include data that is at the lowest level of each dimension, and then the aggregation rules may determine how to aggregate up to higher levels in the dimension.

Figure 6:
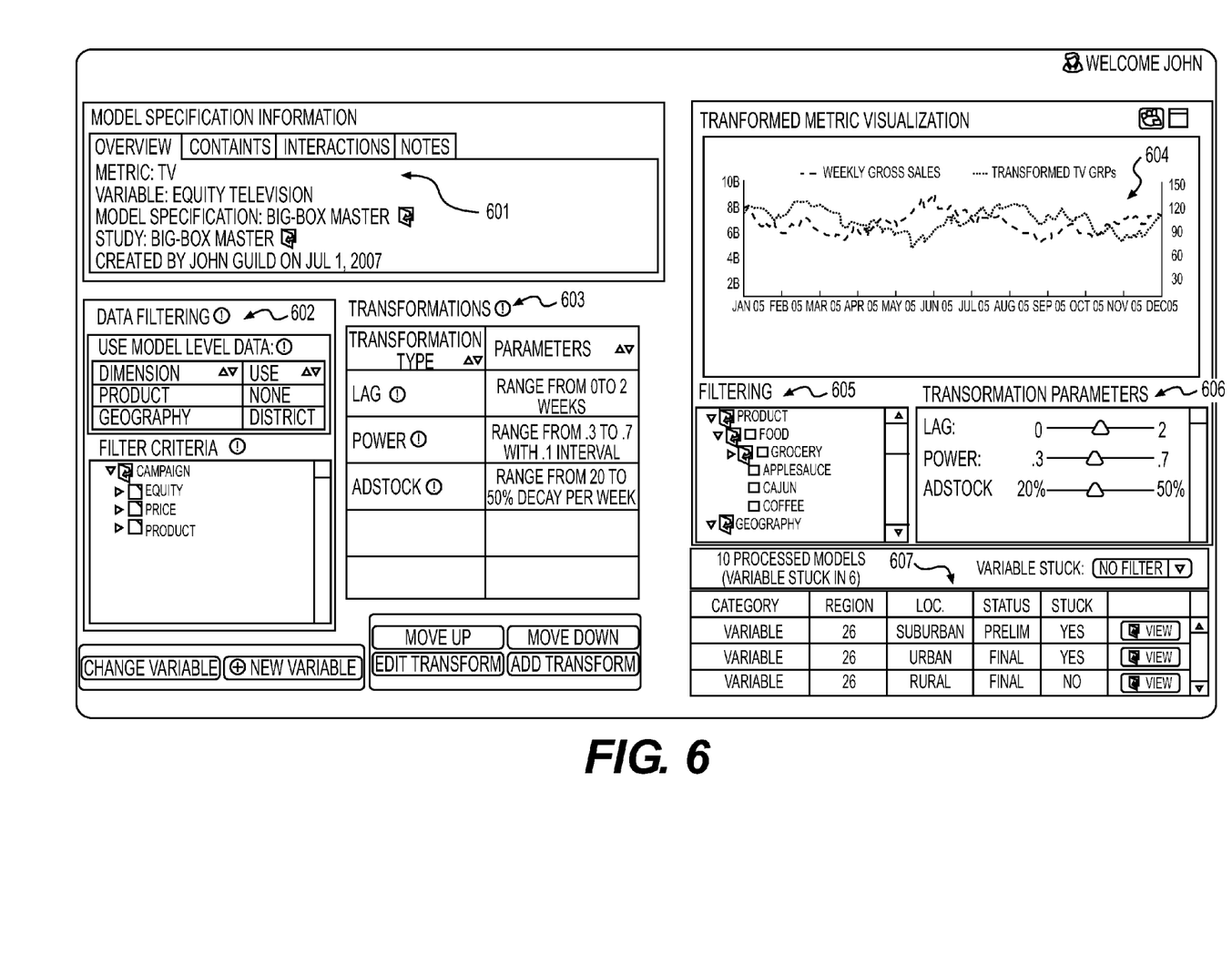
FIG. 6 illustrates an example of a screen shot that may be used to enter and modify variables and assumptions, according to an embodiment.

FIG. 6 illustrates a screen shot that may be generated by the user interface 105 of FIG. 1. The screen shot shows how variables and assumptions may be provided to the system 100 of FIG. 1, and shows examples of how the variables and assumptions may be modified for generating multiple candidate models, such as the candidate models 106 shown in FIG. 1. FIG. 6 also shows an example of an indication of relevance generated for each variable, such as whether the variable was considered to "stick" or not based on the evaluation of the variable in the candidate model. 601 shows overview information that may be entered by the user to describe the model being generated. 602 shows examples of selecting different dimensions and levels that me be selected for different variables. Under filtering in 602, the variables are selected that are associated with brand equity. However, through the "change variable" and the "new variable" button, variables may be modified and new variables may be added. 606 shows the selected variables and the selected dimensions and levels.

603 shows examples of different transformations and transformation parameter values that were selected for the transformations. Through the buttons below the transformations, the transformations may be modified. Also, 606 shows modifying the transformation parameters for the transformations using sliders.

604 shows two curves generated by the model being tested. One curve is the estimated sales and other curve is associated with transformations. 607 shows an indication of relevance for a variable in a particular region (i.e., level of a geography dimension). Note that 607 shows whether the variable stuck which indicates whether the variable was kept in the model. The model may include multiple variables and not all may stick.

Figure 7:
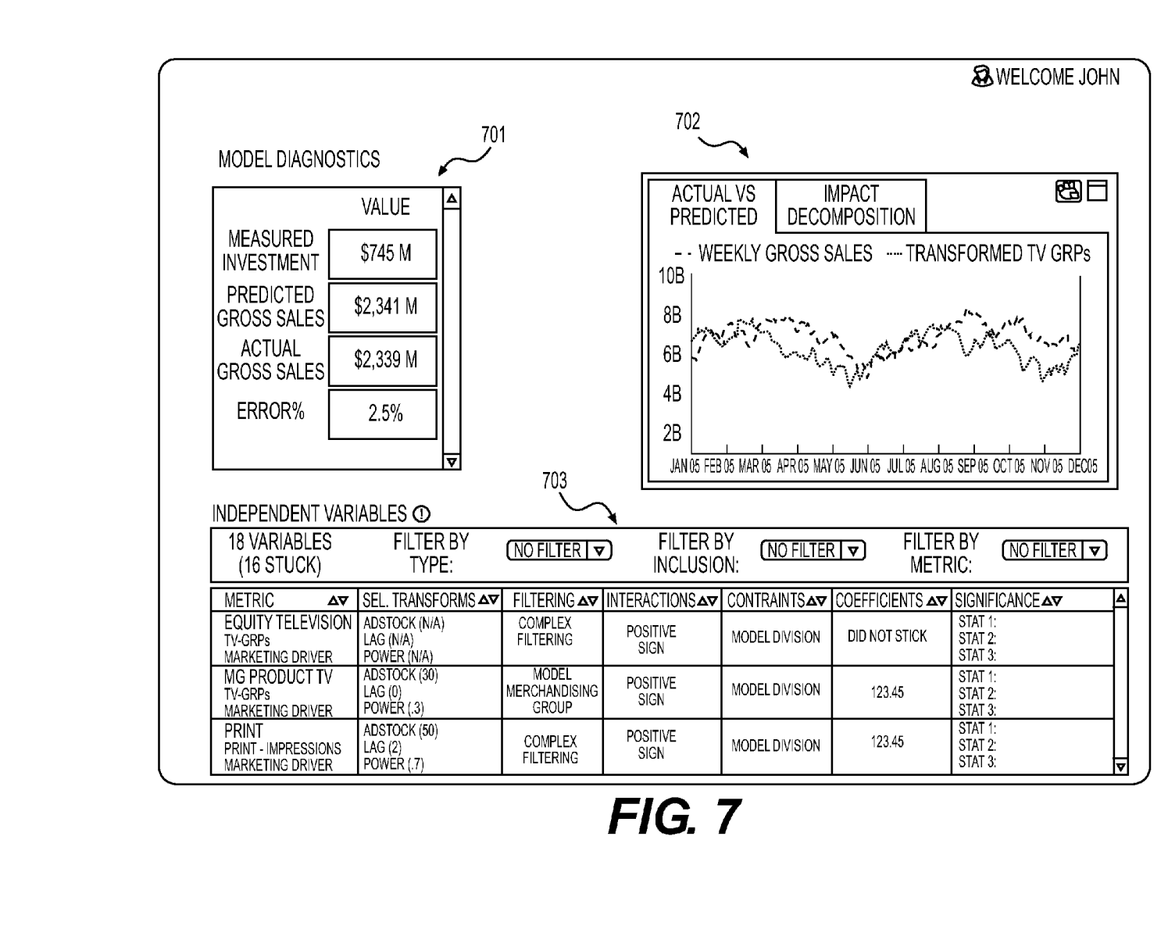
FIG. 7 illustrates an example of a screenshot that may be used to display testing results, according to an embodiment.

FIG. 7 shows a screenshot of testing results for testing candidate models. 701 shows that the testing of the candidate model indicates a 2.5% error between the predicted results and the actual results. 702 shows the error through graphs. 703 shows examples of different variables that were tested in the candidate model, which are shown as metrics. Also, shown are the transformations, and the filters selected. Also, shown are assumption rules or constraints and the modeling coefficients generated for each variable. Also shown is whether the variable was considered to "stick", i.e., the indication of relevance. Out of 18 variables, 16 were considered relevant and are shown as stuck.

Figure 8:
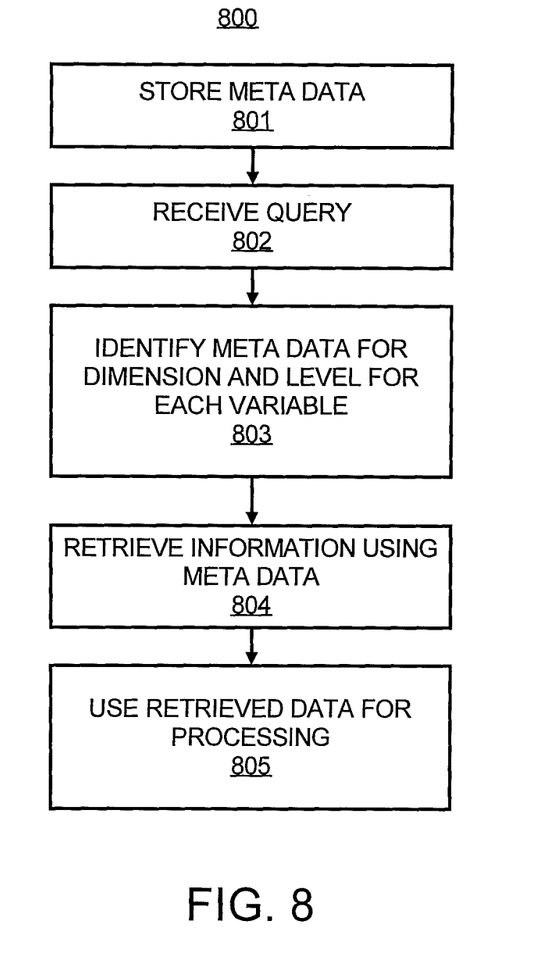
FIG. 8 illustrates a method for performing multidimensional queries using meta data, according to an embodiment.

FIG. 8 shows a method 800 for performing multidimensional queries using the meta data stored in the multidimensional data processing system 120 shown in FIG. 1, according to an embodiment. At step 801, meta data for data in the storage system is created and stored in the multidimensional data processing system 120. The meta data identifies hierarchies for data sets comprised of one or more variables. A hierarchy may include dimensions and levels for variables.

At step 802, a query is received at the multidimensional data processing system 120. The query identifies one or more variables and may identify a dimension and/or a level for each variable.

At step 803, the multidimensional data processing system 120 identifies meta data for the variables. The identifying may include searching stored meta data to identify meta data for the variables at the specified dimension and level for each variable.

At step 804, the multidimensional data processing system 120 retrieves information for the variables from the data storage 101 using the identified meta data. For example, the identified meta data identifies measures in the data storage 101 that are for the specified dimension and level for each variable. The multidimensional data processing system 120 uses the meta data to identify and retrieve the measures from the data storage 101.

At step 805, the retrieved information is used for processing, such as to build a model, for forecasting or to generate views.

Figure 9:
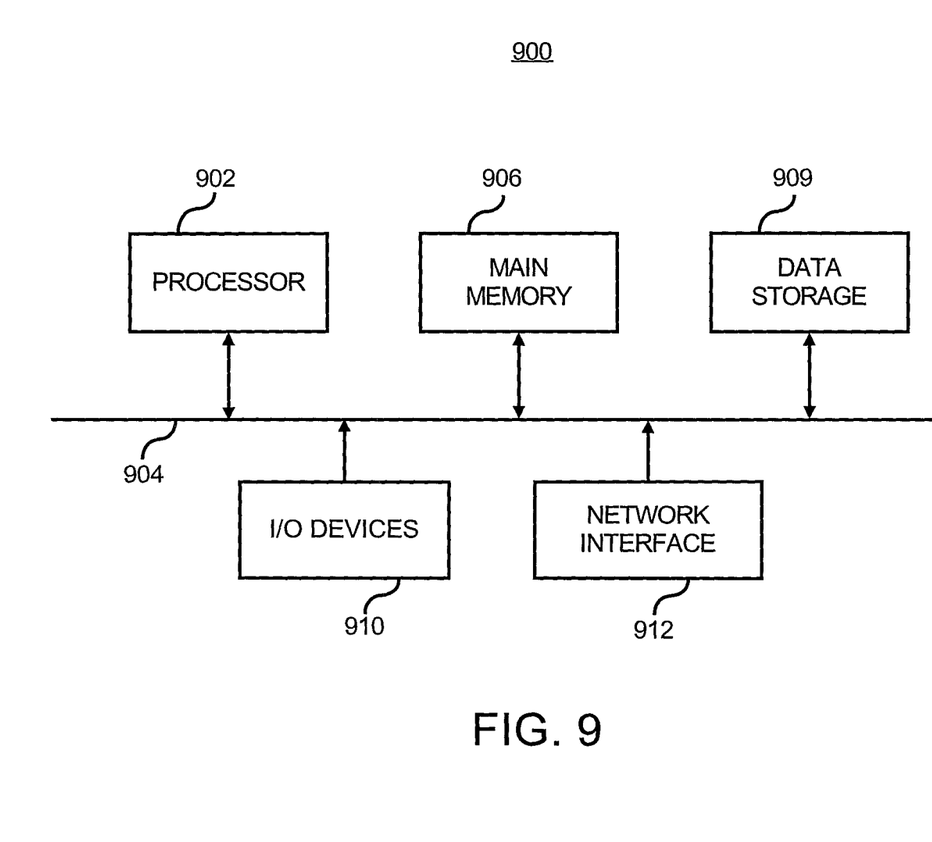
FIG. 9 illustrates a computer system that may be used as a computing platform for one or more of the components of the systems and methods described herein, according to an embodiment.

FIG. 9 shows a computer system 900 that may be used with the embodiments described herein. The computer system 900 represents a generic platform that includes components that may be in a server or other computer system. The computer system 900 may be used as a platform for executing one or more of the methods, functions and other steps described herein. These steps may be embodied as software stored on one or more computer readable storage devices. Furthermore, the components of the system 100 shown in FIG. 1 may be software, hardware or a combination of hardware and software.

The computer system 900 includes a processor 902 that may implement or execute software instructions performing some or all of the methods, functions, and other steps described herein. Commands and data from the processor 902 are communicated over a communication bus 904. The computer system 900 also includes a main memory 906, such as a random access memory (RAM), where the software and data for processor 902 may reside during runtime, and a secondary data storage 909, which may be non-volatile and stores software and data. The memory and data storage are examples of computer readable mediums.

The computer system 900 may include one or more I/O devices 910, such as a keyboard, a mouse, a display, etc. The computer system 900 may include a network interface 912 for connecting to a network. It will be apparent to one of ordinary skill in the art that other known electronic components may be added or substituted in the computer system 900.

One or more of the steps and one or more of the components of the systems described herein may be implemented as computer readable instructions in one or more computer programs stored on a computer readable medium. The computer readable medium may be non-transitory, such as the memory and/or secondary storage. The computer readable instructions are executed on a computer system, for example, by a processor, application-specific integrated circuit (ASIC), or other controller.

While the embodiments have been described with reference to examples, those skilled in the art will be able to make various modifications to the described embodiments without departing from the scope of the claimed embodiments. For example, the systems and method described herein are described generally with respect to modeling variables for sales data. However, the modeling is not limited to sales-related information and is applicable to modeling for other types of data and for other marketing objectives.

What is claimed is:

1. A system comprising:
a multidimensional data processing system to store in a data storage meta data identifying a plurality of variables, a plurality of dimensions for each variable describing attributes of the variable, and a plurality of levels in each dimension and a hierarchy of the dimensions and levels for each variable, and the multidimensional data processing system is to use the meta data to perform multidimensional queries to retrieve data for one or more of the plurality of variables from the data storage;
a variable determination module to determine a subset of variables of the plurality of variables to be used to generate a model, wherein the multidimensional data processing system is to receive an indication of each of the variables from the variable determination module, identify the meta data for the variables, and retrieve information for at least one of the plurality of dimensions and at least one of the plurality of attributes for each of the variables from the data storage using the meta data;
an assumption determination module to determine assumption rules associated with at least one of the variables;
a model generator, executed by a computer system, to receive the information from the multidimensional data processing system and generate a model using the information and the assumption rules; and
a model evaluation module to:
   determine a statistical measure indicating a relevance for each of the variables in the model, wherein the statistical measures are metrics used to evaluate the model and to determine which of the variables to retain for generating the model based on a comparison of the statistical measures to a predetermined relevance threshold;
   determine whether any of the assumption rules are mutually exclusive; and
   in response to a determination of mutually exclusive assumption rules, determine which assumption rule of the mutually exclusive assumption rules is satisfied, retain the satisfied assumption rule and drop the unsatisfied assumption rule,
wherein the model generator is to generate an additional model based on a modification to at least one variable in response to a determination that a number of retained variables is less than a retained variable threshold and the satisfied assumption rule, and
wherein each of the models generated by the model generator is evaluated as a candidate model based on historic data to select a final model for forecasting.

2. The system of claim 1, wherein the multidimensional data processing system is to store meta data for a plurality of different versions of a base data set stored in the data storage, wherein the meta data is to identify the base data set for each version and a differential data set for each version, and the multidimensional data processing system is to use the meta data for a version of the plurality of different versions to retrieve at least one of the base data set and the differential data set for the version from the data storage.

3. The system of claim 2, wherein each differential data set only includes changed information from the base data set.

4. The system of claim 1, further comprising:
a forecasting engine to receive historic data associated with the plurality of dimensions and levels for the variables from the multidimensional data processing system to apply to modeled coefficients in the model for the variables, wherein the modeled coefficients are recursively adjusted over time using the historic data.

5. The system of claim 4, wherein the forecasting engine uses the model to estimate impact on sales for the variables.

6. The system of claim 1, wherein the meta data comprises aggregation rules for the plurality of variables.

7. The system of claim 6, wherein the multidimensional data processing system is to receive a query for data corresponding to a level for a dimension of a variable of the plurality of variables and for data for a predicted variable, and model generator uses the meta data, including the aggregation rules for the variable, to generate the model.

8. The system of claim 7, wherein the model includes a relationship between aggregated data for the level and the predicted variable.

9. The system of claim 1, wherein the multidimensional data processing system stores cubes including the hierarchy for each variable, wherein the hierarchy includes a series of parent-child relationships and each parent represents a consolidation of its children.

10. The system of claim 9, wherein the multidimensional data processing system generates views of one or more of the plurality of variables using the cubes.

11. The system of claim 1, wherein the assumption rules include a predetermined transformation including at least one of ad stocking, advertising lag, and ad saturation for the at least one variable and describes an impact of the at least one variable on an objective or an impact of the at least one variable on another variable in the model.

12. A method for performing multidimensional querying comprising:
    storing meta data in a multidimensional data processing system, wherein the meta data identifies a plurality of variables, a plurality of dimensions for each variable describing attributes of the variable, and a plurality of levels in each dimension, and the meta data indicates a hierarchy of the dimensions and levels for each variable;
    receiving a query identifying variables of the plurality of variables, the dimensions and the levels for each dimension for each of the variables;
    determining assumption rules associated with at least one of the variables;
    searching the stored meta data to identify data in a data storage for the dimensions and the levels for each variable;
    retrieving the data from the data storage using the meta data;
    generating a model based upon the retrieved data and the assumption rules;
    determining a statistical measure indicating a relevance for each of the variables in the model, wherein the statistical measures are metrics used to evaluate the model and determine which of the variables to retain for generating the model based on a comparison of the statistical measures to a predetermined relevance threshold;
    determining whether any of the assumption rules are mutually exclusive;
    in response to determining mutually exclusive assumption rules, determining which assumption rule of the assumption rules is satisfied, retaining the satisfied assumption rule and dropping the unsatisfied assumption rule; and
    generating an additional model based on a modification to at least one variable in response to a determination that a number of retained variables is less than a retained variable threshold, wherein each of the generated models is evaluated as a candidate model based on historic data to select a final model for forecasting.

13. The method of claim 12, further comprising:
    storing version meta data for a plurality of different versions of a base data set, wherein the version meta data identifies the base data set for each version and a differential data set for each version; and
    using the version meta data for a version of the plurality of different versions to retrieve at least one of the base data set and the differential data set for the version from the data storage.

14. The method of claim 13, wherein each differential data set only includes changed information from the base data set.

15. The method of claim 12, wherein the variables include an independent variable and a predicted variable, and the method further comprises:
    forecasting values for the predicted variable using the model.

16. The method of claim 12, wherein the model identifies a relationship between the dimensions and levels for the plurality of variables.

17. The method of claim 12, wherein the assumption rules include a predetermined transformation including at least one of ad stocking, advertising lag, and ad saturation for the at least one variable and describes an impact of the at least one variable on an objective or an impact of the at least one variable on another variable-in the model.

18. A non-transitory computer readable medium storing computer readable instructions that when executed by a computer system perform a method comprising:
    storing meta data in a multidimensional data processing system, wherein the meta data identifies a plurality of variables, a plurality of dimensions for each variable describing attributes of the variable, and a plurality of levels in each dimension, and the meta data indicates a hierarchy of the dimensions and levels for each variable;
    receiving a query identifying variables of the plurality of variables, the dimensions and the levels for each dimension for each of the variables;
    determining assumption rules associated with at least one of the variables;
    searching the stored meta data to identify data in a data storage for the dimensions and the levels for the variables;
    retrieving the data from the data storage using the meta data;
    generating a model based upon the received data and the assumption rules;
    determining a statistical measure to indicate a relevance for each of the variables in the model, wherein the statistical measure are metrics used to evaluate the model and determine which of the variables to retain for generating the model based on a comparison of the statistical measures to a predetermined relevance threshold;
    determining whether any of the assumption rules are mutually exclusive;
    in response to determining mutually exclusive assumption rules, determining which assumption rule of the assumption rules is satisfied, retaining the satisfied assumption rule and dropping the unsatisfied assumption rule; and
    generating an additional model based on a modification to at least one variable in response to a determination that a number of retained variables is less than a retained variable threshold, wherein each of the generated models is evaluated as a candidate model based on historic data to select a final model for forecasting.

19. The system according to claim 1, wherein the model generator receives a selection of one of the plurality of dimensions of at least one of the variables and a selection of one of the plurality of levels in the hierarchy for the dimension, and generates the model according to the selected dimension and the selected level.

* * * * *